INVENTOR
PIERRE ANDRÉ GEORGES LEPELLETIER
By Young & Thompson
ATTYS.

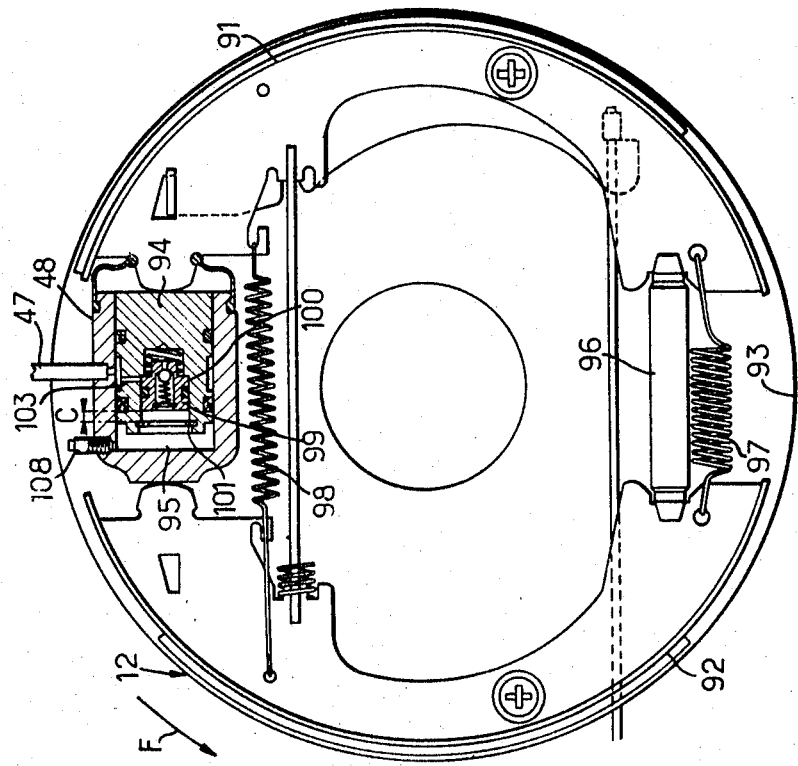

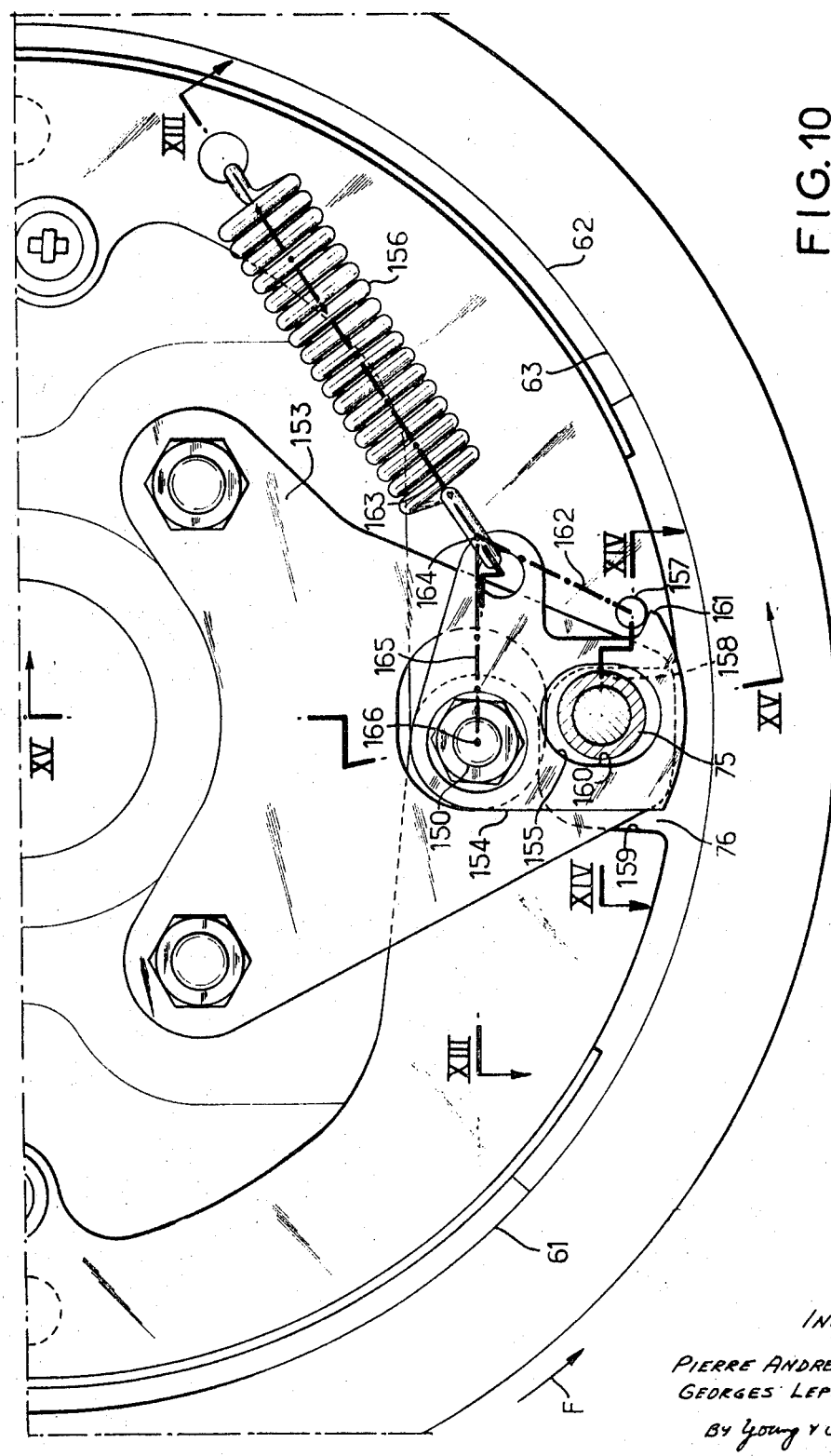

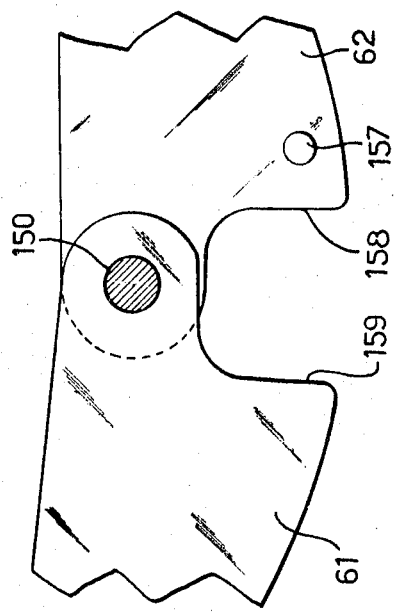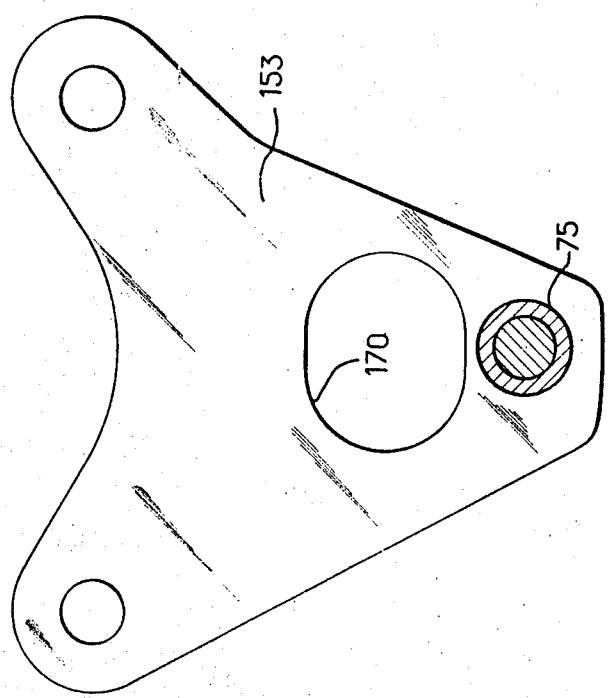

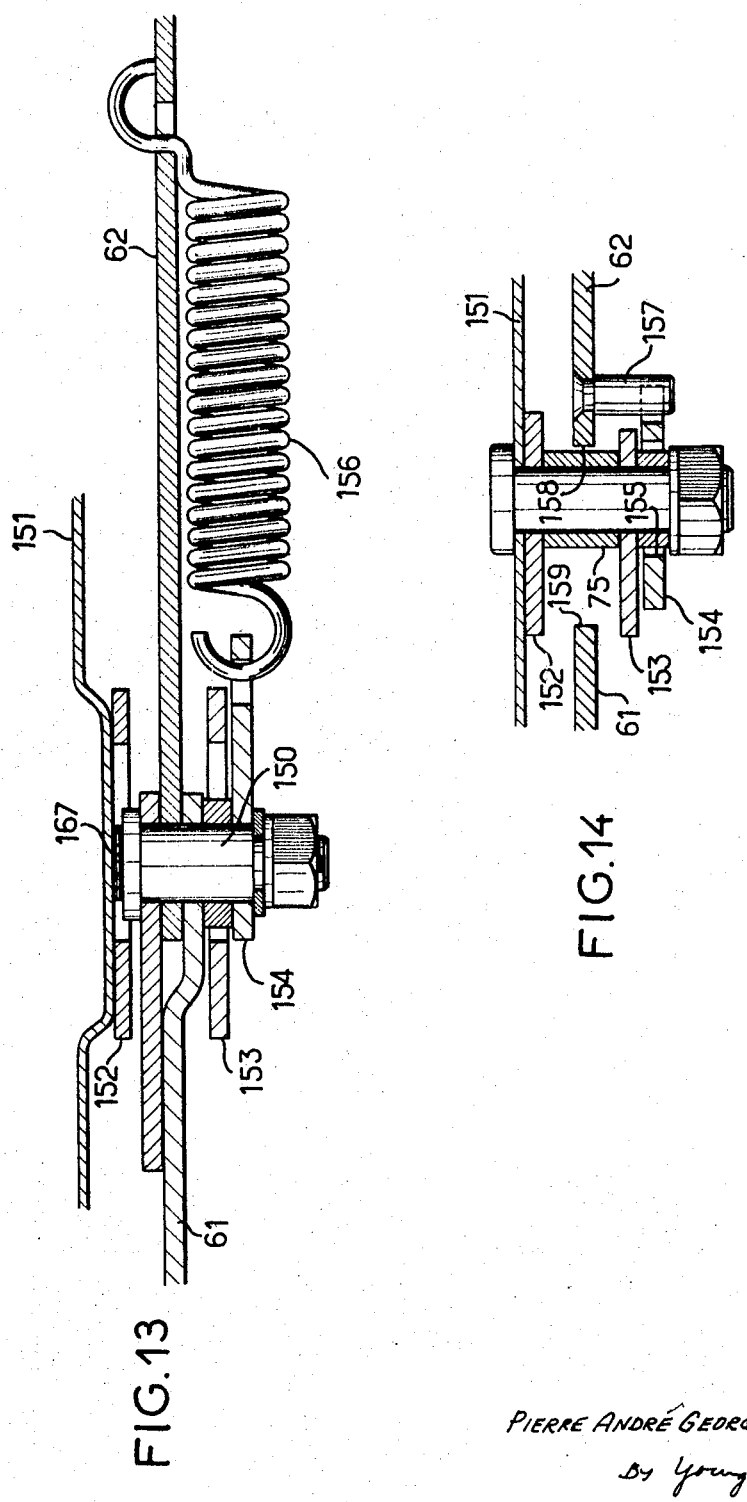

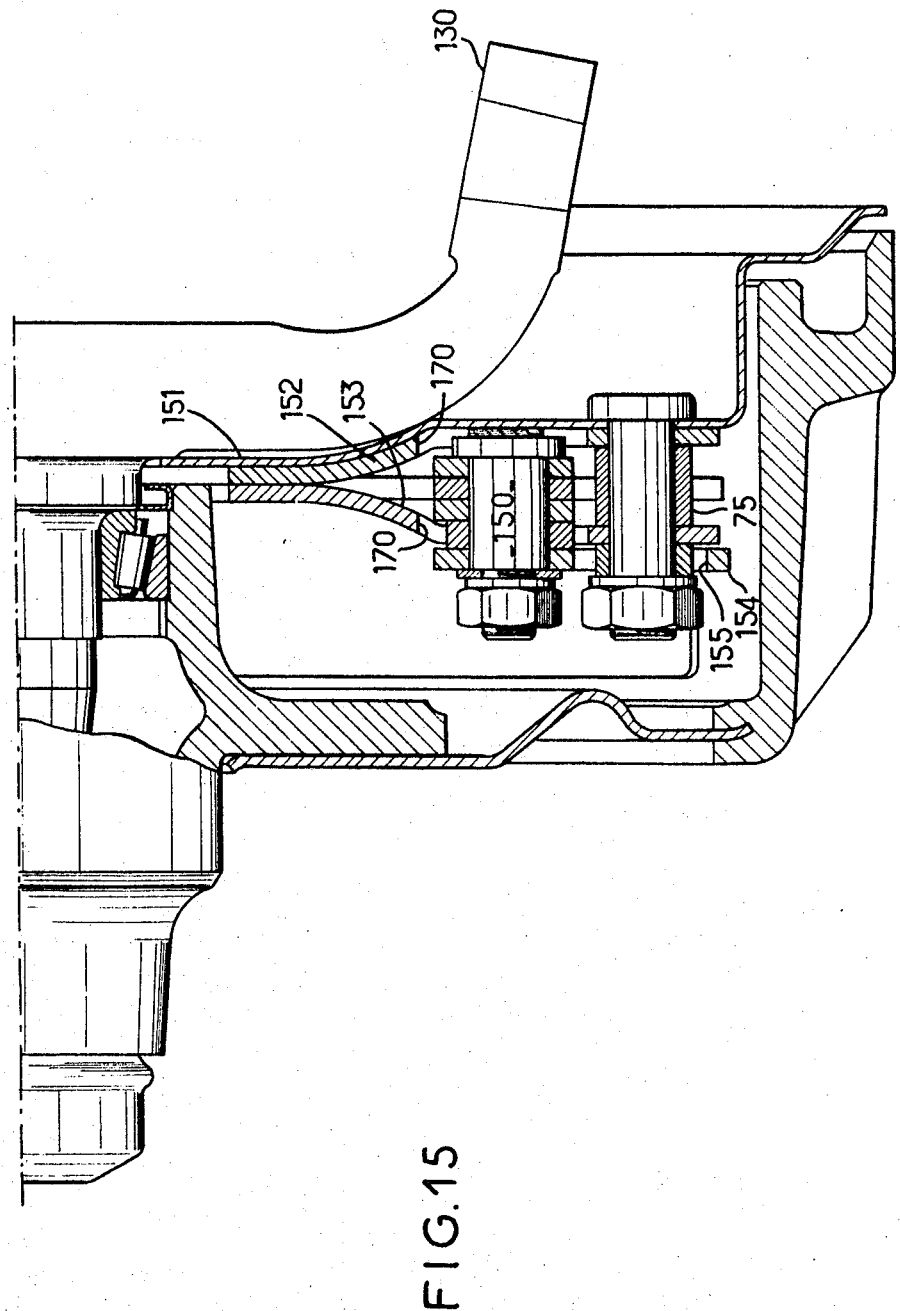

Aug. 5, 1969 P. A. G. LEPELLETIER 3,459,281
DOUBLE CIRCUIT HYDRAULIC BRAKE
Filed May 22, 1967 9 Sheets-Sheet 9
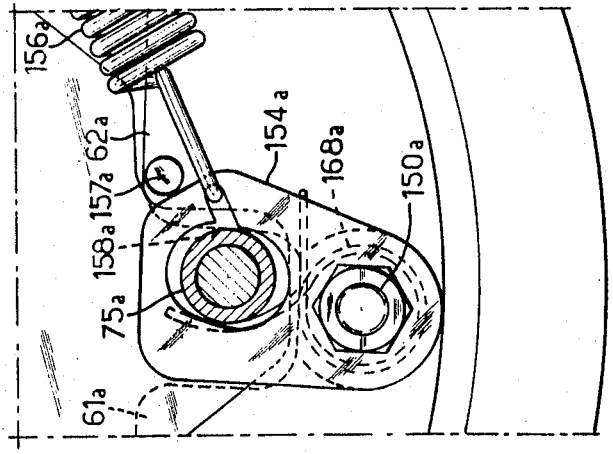
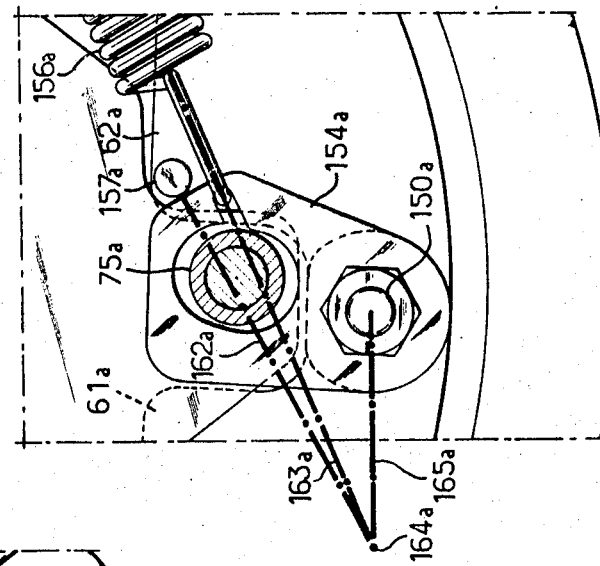
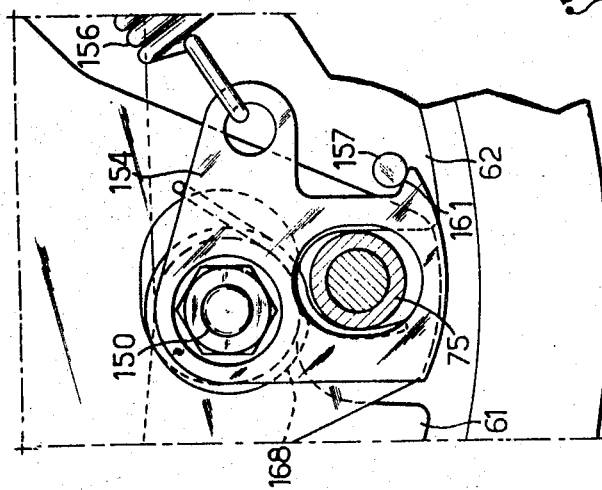
INVENTOR
PIERRE ANDRÉ
GEORGES LEPELLETIER
By Young + Thompson
ATTYS.

United States Patent Office 3,459,281
Patented Aug. 5, 1969

3,459,281
DOUBLE CIRCUIT HYDRAULIC BRAKE
Pierre André Georges Lepelletier, Chatou, France, assignor to Société Anonyme Francaise du Ferodo, Paris, France, a corporation of France
Filed May 22, 1967, Ser. No. 640,210
Claims priority, application France, June 2, 1966, 63,829
Int. Cl. F16d 51/00; B60t 11/10
U.S. Cl. 188—78
19 Claims

ABSTRACT OF THE DISCLOSURE

A double-circuit hydraulic brake comprising a fixed wheel-cylinder housing two opposite pistons adapted to co-operate respectively with two hydraulic chambers formed in said wheel-cylinder, two brake jaws respectively coupled to said pistons and intended to come into frictional contact with the rotating brake-drum, coupling means for connecting said jaws together in a zone diametrically opposite to said wheel-cylinder, and a fixed support interposed between said jaws in said zone, either of said jaws being applied against said fixed support while the other jaw is spaced apart from said fixed support by a pre-determined clearance.

---

The present invention relates to hydraulic brake installations, especially for automobile vehicles, and in particular to elements of such installations, such as the brakes themselves, to accessories of the brakes as, for example, devices for taking-up wear, etc.

One of the objects of the invention is a brake with a double hydraulic circuit, the construction of which is improved and provides excellent operation on forward running and in reverse running, with suitably distributed wear.

The double circuit brake in accordance with the invention is especially characterized in that it comprises a fixed wheel cylinder receiving two opposite pistons co-operating respectively with two hydraulic chambers formed in the said wheel cylinder, two jaws which are respectively coupled to the said pistons and which are intended to rub against a rotating drum, coupling means for connecting together the said jaws in a region diametrically opposite to the wheel cylinder, and a fixed support interposed in this region between the said jaws, on which fixed support either one or the other of the jaws can be applied, while the remaining jaw is spaced apart therefrom by a definite clearance.

In one form of construction, the coupling means of the two jaws comprise a spacing strap, by which the two jaws co-operate in mutual abutment and on which they are held elastically, while in an alternative form, the coupling means of the two jaws comprise an articulation pivot further receiving in pivotal mounting a centering plate co-operating with the fixed support and connected by a spring to one of the jaws, while being returned by this spring to be applied in abutment against a finger fixed to the said jaw.

Figure 1:
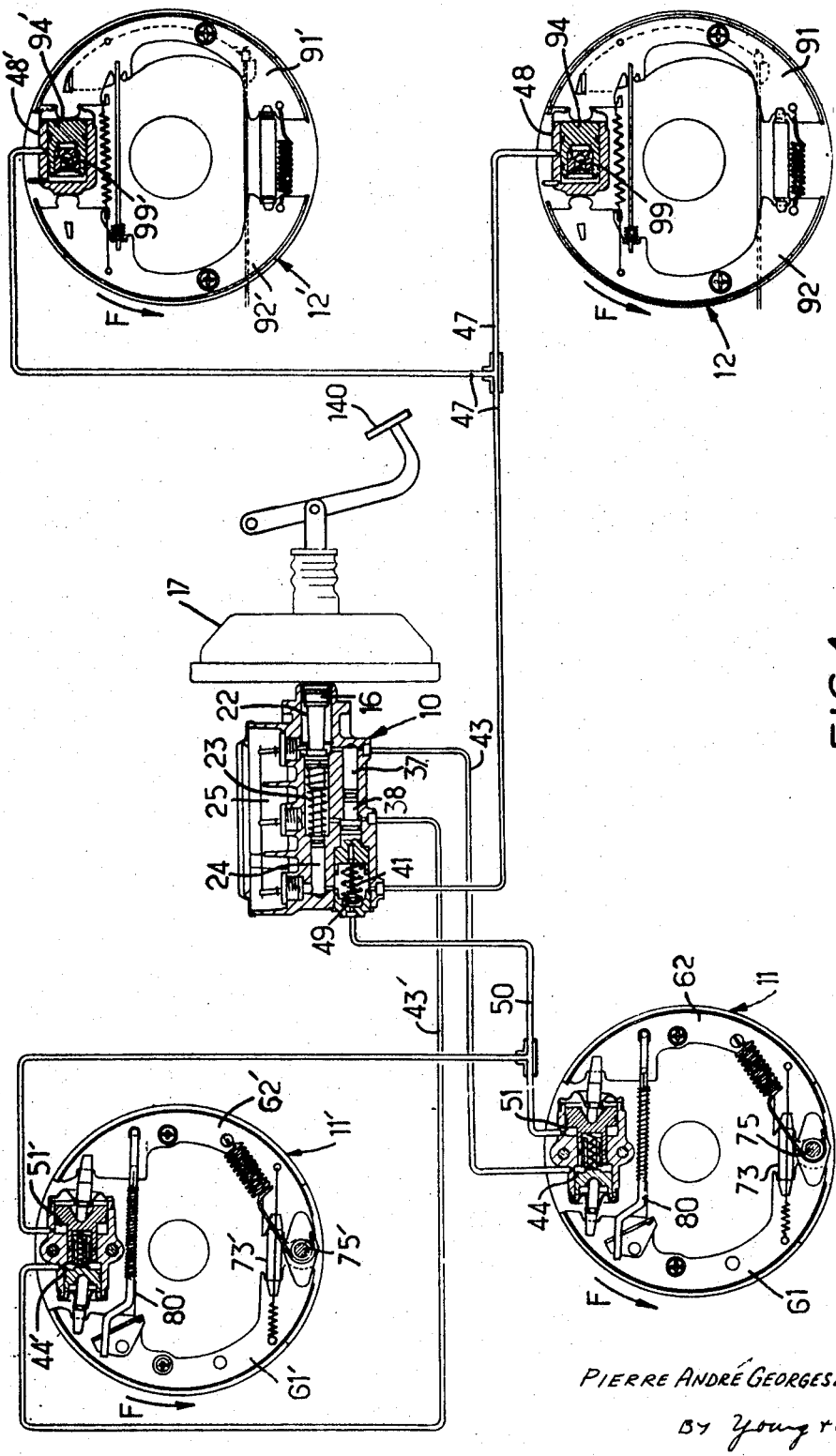
Figure 2:
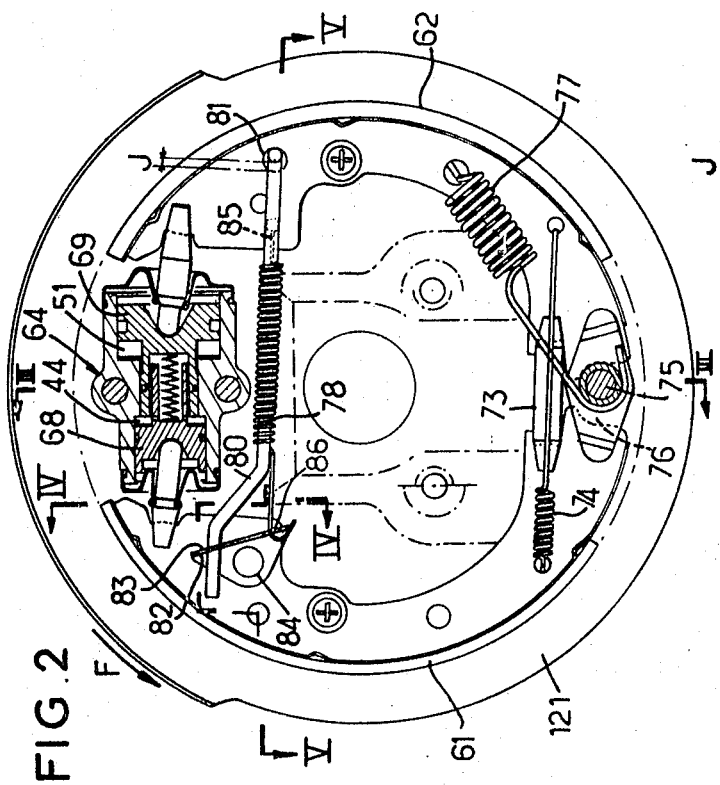
Figure 5:
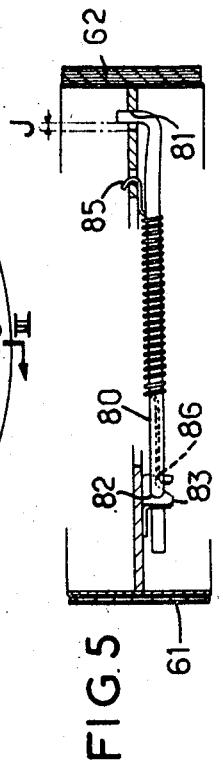
Figure 3:
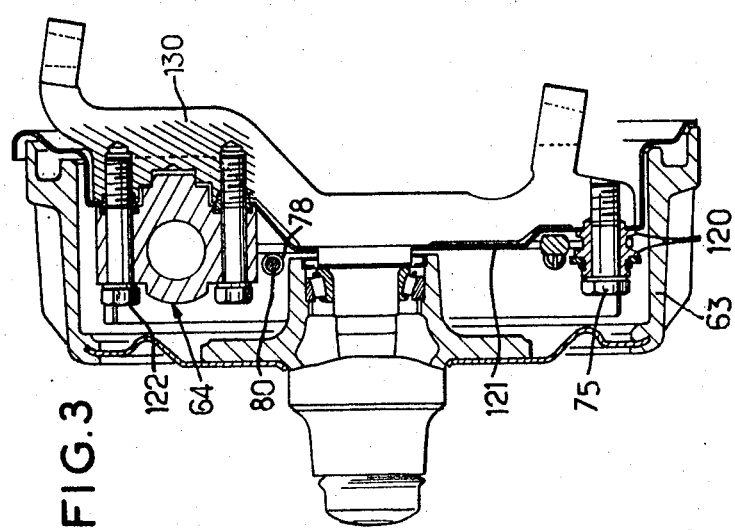
Figure 4:
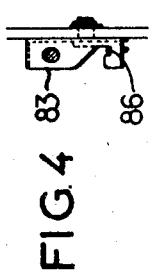
Figures 8, 9:
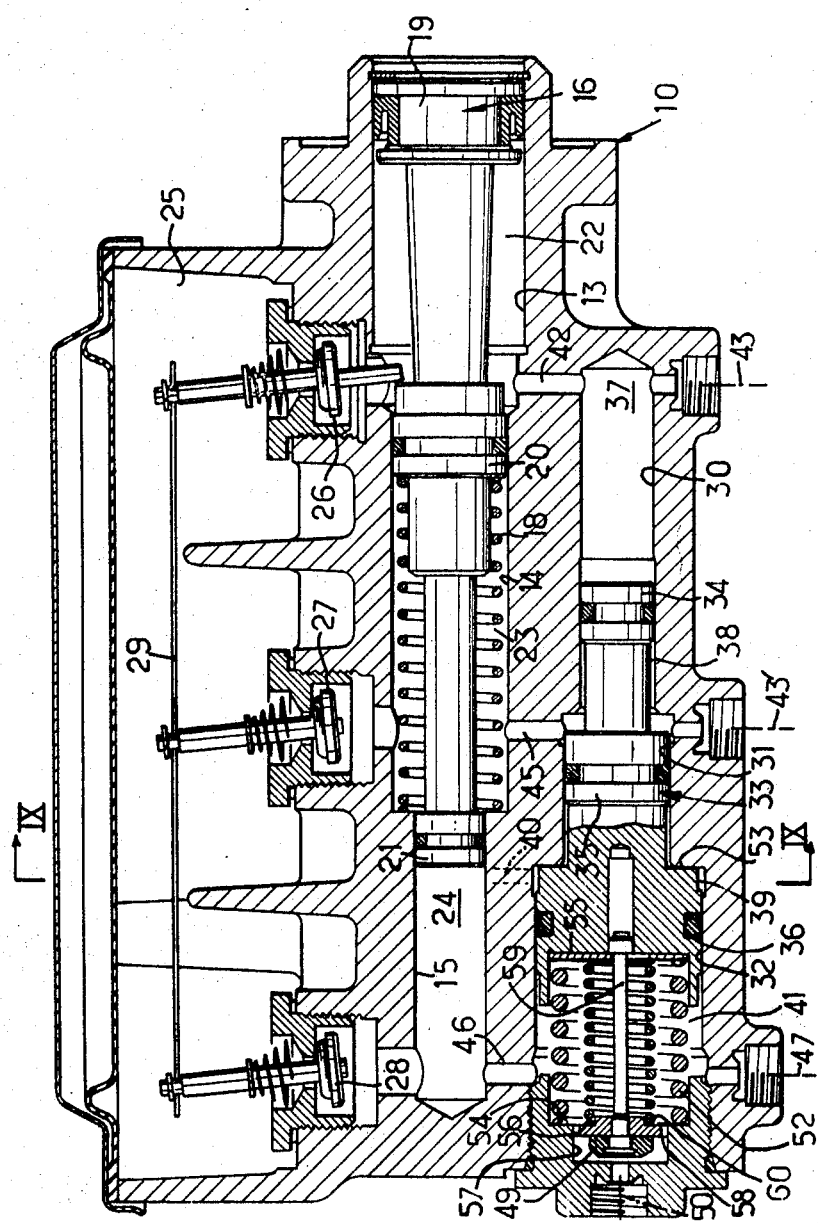

The objects, characteristic features and advantages of the invention will further become apparent from the description which follows below of forms of embodiment chosen by way of example, reference being made to the accompanying drawings, in which:

FIG. 1 is a general diagrammatic view of a braking installation for an automobile vehicle in accordance with the invention;
FIG. 2 is a view in elevation to a larger scale, with parts in section, of one of the front brakes;
FIG. 3 is a corresponding view in transverse section, taken along the line III—III of FIG. 2;
FIG. 4 is a view of a device for taking-up wear of the brake of FIGS. 2 and 3, in cross-section taken along the broken line IV—IV of FIG. 2;
FIG. 5 is a view of this device in the direction of the arrows V—V of FIG. 2;
FIG. 6 is a view in cross-section, to a still larger scale, of the wheel cylinder of the front brake shown in FIGS. 2 and 3;
FIG. 7 shows one of the rear brakes, in elevation with parts in cross-section;
FIG. 8 is a view in longitudinal section of the master-cylinder of the braking installation;
FIG. 9 is a corresponding half-view of this master-cylinder, taken in cross-section following the line IX—IX of FIG. 8;
FIG. 10 is a half-view to a large scale, of an alternative form of front brake;
FIG. 11 is a view of one of the supporting parts fixed to the stationary end-plate of this brake and carrying the fixed support;
FIG. 12 shows the two jaws of the brake of FIG. 10 which are coupled together by an articulation;
FIG. 13 is a view of the brake of FIG. 10 in cross-section, taken along the broken line XIII—XIII of FIG. 10;
FIG. 14 is a view of the brake of FIG. 10, in cross-section taken along the broken line XIV—XIV of FIG. 10;
FIG. 15 is a view of the brake of FIG. 10 taken in cross-section along the broken line XV—XV of FIG. 10;
FIG. 16 is a partial view similar to that of FIG. 10, but in which a restoring spring is interposed between the articulation of the two jaws and the fixed support;
FIG. 17 relates to an alternative form in which the respective positions of the articulation of the two jaws and the fixed support are modified;
FIG. 18 is similar to FIG. 17, but in which a restoring spring is interposed between the articulation of the two jaws and the fixed support.

Reference will first be made to FIGS. 1 to 9 which are concerned with an application of the invention to a braking installation of an automobile vehicle.

There can be seen at 10 a master-cylinder, at 11 and 11' the brakes of a first axle, for example the front brakes, and at 12 and 12' the brakes of a second axle, for example the rear brakes.

As shown in FIGS. 8 and 9, the master-cylinder 10 comprises three stepped bores 13, 14 and 15, receiving a master-piston 16. This latter is actuated by a brake-pedal 140, for example through the intermediary of a servo-brake 17, and is returned to the position of rest by a restoring spring 18.

The master-piston 16 comprises three pistons 19, 20 and 21, of decreasing diameters, engaged respectively in the bores 13, 14 and 15. Between the pistons 19 and 20 is formed a first primary thrust chamber 22. Between the pistons 20 and 21 is formed a second primary thrust chamber 23. At the front of the piston 21 is formed a secondary thrust chamber 24.

The arrangement of a secondary chamber 24 in front of the master-cylinder 10 can be provided with advantage, by virtue of a sufficient diameter of the bore 15 and of the coupling at 29 of the valves 26, 27 and 28, which simplifies the construction and enables the spring 18 to be housed in the chamber 23. The chambers 22, 23 and 24 are connected to a tank 25 through the intermediary of the valves 26, 27 and 28 which are coupled together by a rod 29 and which are intended to tilt in response to the displacements of the master-piston 16, through the intermediary of the tail 26 of one of them. Each of the valves 26, 27 and 28 is half open when the master-piston 16 is in its position of rest, and is closed when the master-piston 16 begins to be depressed.

The master-cylinder 10 further comprises a pressure coupling station having three bores in line, 30, 31 and 32. The axis of the bores 30, 31 and 32 is parallel to that of the bores 13, 14 and 15. In the bores 30, 31 and 32 is engaged a plunger 33 comprising three pistons 34, 35 and 36, respectively engaged in the bores 30, 31 and 32.

The bore 30 contains a primary pressure chamber 37. Between the pistons 34 and 35 is arranged a second primary pressure chamber 38. Between the pistons 35 and 36 is arranged a space 39 which communicates permanently by means of a conduit 40 (see FIGS. 8 and 9) with the tank 25. In front of the piston 36 is formed a secondary pressure chamber 41.

The first primary pressure chamber 37 is connected on the one hand through a passage 42 with the first primary thrust chamber 22, and on the other hand through a conduit 43 to a so-called primary chamber 44 of the left-hand front brake 11 (see FIGS. 1 and 8).

The second primary pressure chamber 38 is connected on the one hand by a passage 45 with the second primary thrust chamber 23 and on the other hand through a conduit 43′ to a so-called primary chamber 44′ of the right-hand front brake 11′.

The master-cylinder 10 is arranged in such manner that it drives equal or proportional volumes (equal in the example shown) into the primary chambers 44 and 44′ of the front brakes 11 and 11′. In addition, the master-cylinder 10 expels a small volume of oil from the secondary thrust chamber 24 during the depression of the master-piston 16.

The secondary pressure chamber 41 is continuously connected on the one hand through a passage 46 with the secondary thrust chamber 24 and on the other hand through conduits 47 with cylinders 48 and 48′ of the rear left-hand brakes 12 and the rear right-hand brakes 12′.

The secondary pressure chamber 41 is furthermore connected through the intermediary of a clapper-valve 49, to a conduit 50 coupled to the secondary chambers 51 and 51′ of the front brakes 11 and 11′.

The plunger 33 is acted upon by a comparison of the pressure at 41 with the pressures at 37 and 38, and tends to be returned by a spring 52 into a position of rest in which it is in abutment against a shoulder 53.

The spring 52 is supported by one of its extremities against a fixed bearing surface 54 and by its other extremity against a plate 55 which is intended to be applied against the plunger 33.

The valve 49 is mounted on a washer 56 slidably engaged in a bore 57 and having castellations 58 to permit the free passage of oil.

A spacing rod 59 coupling the plate 55 to the washer 56 defines a maximum distance between these two parts, while a spring 60, surrounding the rod 59 and acting between the said parts 55 and 56 tends to keep this distance at its maximum.

In the position in which the plunger 33 is in abutment at 53, the valve 49 is open. When the plunger 33 is displaced towards the left of FIG. 9 of its abutment position at 53, against the action of the spring 52, the other spring 60 tends to keep the valve 49 closed.

It will be noted that the master-cylinder 10 with parallel bores 13, 14 and 15 and 30, 31 and 32, is easy to machine, and that the secondary circuit has no other connection to the atmosphere than by the rocking-valve 28 when the brake is not operated.

The front brakes 11 and 11′ (FIGS. 1 to 6) are of the type with jaws 61 and 62 co-operating with a rotating drum 63. The left-hand front brake 11 will be described below in more detail.

The wheel cylinder 64 for actuating the jaws of the left-hand front brake 11 is fixed at 122 on the stub-axle 130 and/or on the brake-plate 121. As shown in FIG. 6, it comprises three bores in line, 65, 66 and 67.

In an end bore 65 is engaged a primary piston 68 while in the other end bore 66 a secondary piston 69 is engaged. In the intermediate bore 67 is engaged a tail 70 of the secondary piston 69. The secondary bore 66 is of larger diameter than the primary bore 65 which is in turn larger in diameter than the intermediate bore 67.

There can be seen at 71 the sealing joints between the pistons 68, 69 and 70 and the bores 65, 66 and 67 respectively. A small spring 72 is interposed between the pistons 67 and 68 and acts in the direction tending to move them away from each other. The two pistons 67 and 68 are simply mounted floating in the bores 65 and 66.

The primary chamber 44 is de-limited by the primary piston 68 along the section of the bore 65, and also partly by the secondary piston 69 according to the section of the bore 67, while the secondary chamber 51 is de-limited by the secondary piston 69 following the differential section of the bores 66 and 67. The piston 68 is coupled to the so-called primary jaw 61, while the piston 69 is coupled to the jaw 62, known as the secondary jaw.

The two jaws 61 and 62 (see FIGS. 2 to 5) are interconnected in reciprocal abutment through the intermediary of a spacing strap 73, of fixed length, mounted opposite the wheel cylinder 64. An auxiliary spring 74 is coupled between the jaws 61 and 62 in the region of the strap 73, and maintains the contact between 61, 73 and 62, 73.

A fixed supporting point 75 is provided between the jaws 61 and 62 in the vicinity of the strap 73, and is intended to co-operate by application against one jaw or the other, 61, 62, while being spaced apart by a clearance 76 from the remaining jaw.

The secondary jaw 62 is normally applied against the support 75, while the primary jaw 61 is spaced apart therefrom by the clearance 76. The clearance 76 is chosen to be sufficient for the rotation of the assembly 61, 62 to be able to ensure the desired flow-rate of secondary oil. A centering spring 77 is mounted between the fixed support 75 and the jaw 62 and tends to hold the latter applied against the support 75. The support 75 also serves, by means of two cheeks 120 (see FIG. 3) to complete the lateral maintenance of the two jaws, further provided for by any appropriate means with respect to the brake-plate 121.

A general restoring spring 78 acts between the two jaws 61 and 62 in the vicinity of the wheel cylinder 64. The spring 78 tends to bring the jaws 61 and 62 closer together, while moving them away from the drum 63 towards a position of rest defined by a minimum condition of distance.

A device for taking-up wear (see FIGS. 2 to 5) is provided in such manner as to maintain at a sufficient minimum the approach travel of the jaws 61 and 62 with respect to the drum 63, irrespective of the wear of the linings of the said jaws. This device comprises a rod 80 which is engaged at one extremity with a clearance J in a port 81 of the jaw 62, while the other extremity of the rod 80 is engaged in a hole 82 of a square-shaped iron member 83 pivotally mounted at 84 on the jaw 61. The restoring spring 78 is freely engaged around the rod 80, and is coupled at one extremity at 85 to the jaw 2 and at the other extremity at 86 to the pivoted square member 83.

The approach travel is defined by the clearance J formed between the rod 80 and the orifice 81.

The engagement of the rod 80 in the hole 82 of the pivoted square member 83 provides a wedging action in the direction in which the jaws 61 and 62 are brought closer to each other by the spring 78 when released. When the linings of the jaws 61 and 62 become worn, the jaws require a longer travel to reach the drum 63, which, at a given moment, applies a tractive pull on the rod 80 with respect to the hole 82. Such a movement is effected by releasing the wedging action and is possible. On the other hand, in the return direction, the rod 80 no longer leaves its new position in the hole 82, which keeps the travel J unchanged.

It will be noted that the device for taking-up wear has a continuous action and a constant withdrawal, with low friction in the direction of the expanding force. This device further permits of easy replacement of worn linings by new linings, since it is only necessary to act manually on the pivotal member 83 so as to permit the rod 80 to be brought into the appropriate position.

In the course of wear, the jaws 61 and 62 become progressively farther apart, and the bores 65 and 66 of the wheel cylinders are made sufficiently deep for the pistons 68 and 69 to be able to admit a variable distance apart of this kind.

In addition to the device for taking-up wear 80, 81, 84, with the clearance J (see FIG. 2) acting on the assembly of the jaws 61 and 62, there is provided, as shown in FIG. 6, a device more particularly associated with the jaw 62, and comprising a ring 180 engaged on the tail 70 and held in position by a spring 181 against an abutment 182 rigidly fixed to the tail 70. The ring 180 has a peripheral groove in which is engaged with slight play a keeper-ring 183 providing a hard friction fit in the bore 66. The device 180, 183 enables the jaw 62 to be positioned, at the same time taking-up the wear.

The right-hand front brake 11' has a construction similar to that of the left-hand front brake 11.

It will be appreciated that the construction of the front brakes is simple and neat as a whole, and in particular as regards the wheel-cylinder 64, which is at the same time of small size, easy to fix at 122 and easy to supply through the conduits 43 and 50.

It will be noted that the centering of the jaws 61 and 62 at rest is effected in all cases on the fixed support 75 in a position which is independent of the direction of rotation of the drum 63. In addition, the wear of the linings is distributed along the jaws 61 and 62 in all light applications of the brake, by virtue of the spring 77 which retards the application of the jaw 62 against the drum 63.

The rear brakes 12 and 12' are also of the type with jaws 91 and 92 co-operating with a drum 93 (see FIG. 7) but they have a single supply by means of the conduit 47 and the wheel-cylinder 48. They operate with a self-releasing action during the course of braking on forward running (arrow F) and with a self-applying action during the course of braking on reverse running.

The rear left-hand brake 12 will now be more particularly described.

In the wheel-cylinder 48, a piston 94 is engaged in a pressure chamber 95 coupled to the conduit 47 and comprising a blow-off plug 108. The piston 94 co-operates with the jaw 91, which is interconnected by a strap 96 to the jaw 92, which is in turn in abutment and supported against the bottom of the cylinder 48. A spring 97 is coupled between the jaws 91 and 92 in the region of the strap 96 and maintains the contacts at 91, 96 and 96, 92. A general restoring spring 98 acts between the jaws 91 and 92 and tends to bring the jaws 91 and 92 closer together by moving them away from the drum 93 towards a position of rest defined by a minimum distance condition (see FIG. 7).

A device for taking-up wear is provided so as to maintain the approach travel of the jaws 91 and 92 at a sufficient minimum with respect to the drum 93, irrespective of the state of wear of the linings of the said jaws.

Whereas the device for taking-up wear has been provided as a mechanical type for the front brakes, it is provided as a hydraulic device in the rear brakes, and comprises a small piston 99 slidably engaged in the piston 94 with a pre-determined travel C between two abutments formed respectively by a shoulder 100 and by a stop-ring 101.

The right-hand rear brake 12' is of similar construction to that which has just been described for the left-hand rear brake 12.

During the course of braking on forward running (in the direction of the arrows F) the volumes of oil expelled from the master-cylinder 10 through the conduits 43 and 43' into the primary chambers 44 and 44' of the front brakes 11 and 11', cause an outward movement of the primary pistons 68 and 68'. The piston 68 pushes the jaw 61 into contact with the drum 63. The jaw 61 in turn pushes, through the strap or rod 73, the other jaw 62 which comes in its turn into contact with the drum 63, against the action of the centering spring 77. In such a position of contact of the jaws 61 and 62 against the drum 63, the jaws 61 and 62 are both spaced apart from the fixed support 75.

The secondary pistons 69 and 69' move inwards towards the primary chambers 44 and 44'. In each front brake there is a double movement of expansion and winding of the jaws 61 and 62. The rotation of the drum 63 in the direction of the arrow F produces a braking reaction which causes a high pressure in the secondary chambers 51 and 51'. This high pressure is the same in both 51 and 51', since the conduit 50 forms a communication between the chambers 51 and 51'.

The secondary pressure in the secondary pressure chamber 41 of the master-cylinder 10 is substantially higher than the pressures in the primary pressure chambers 37 and 38. The plunger 33 is held pushed back towards the right of FIG. 9 in abutment against the shoulder 53, and the clapper valve 49 is held open. The two primary pressures are independent of each other, which permits an appropriate balancing to be obtained by the secondary pressure at the level of the front brakes 11 and 11'.

The arrangement is such that during braking on forward running in normal service, there is obtained a torque/pedal pressure characteristic which is substantially linear as a function of the coefficient of friction of the linings.

The secondary pressure transmitted through the conduit 50 passes freely through the open valve 49 and the conduits 47 to the rear brakes 12 and 12', which are applied with a self-releasing operation and under high pressure, favourable to a good balancing effect without risk of accidental blocking.

In the case of braking during reverse running (direction opposite to that of the arrow F), the reactions of the jaws 61 and 62 of the front brakes 11 and 11' are reversed. The secondary jaw 62 remains applied against the fixed support 75, which prevents any risk of jerks, and it acts as a compressed jaw under the action of the secondary piston 69. The primary jaw 61 is supported against the crank-arm 73 and acts as a tensioned jaw under the action of the primary piston 68.

The secondary pressure becomes small or nil or even possibly the secondary chambers are put momentarily under a depression. The primary pressure acts on the compressed jaw 62 following the section of the bore 67, and on the tensioned jaw 61 following the section of the bore 65, that is to say a greater section, which makes it possible to distribute the work of the jaws in a substantially uniform manner.

The brakes 11 and 11' are less powerful on reverse running than on forward running, for example only half as powerful, which is quite suitable to automobile applications in general. The primary pressures at 37 and 38 have a preponderant action on the plunger 33 which moves towards the left of FIG. 9, causing the closure of the clapper-valve 49 under the control of the spring 60. The oil is driven into the conduits 47 due to the effect of the reduction in volume of the chambers 24 and 41, towards the rear brakes 12 and 12' which act as self-applying brakes.

It will be appreciated that the arrangement in accordance with the invention provides an appropriate distribution of the braking power between the front and the rear during the cource of a braking action on reverse running. In particular, good results have been obtained by choosing a moderate power for the brakes 11 and 11' and an increased power for the brakes 12 and 12'. More particularly, the brakes 11 and 11' are prevented from becoming locked, except under the effect of a high pressure. It will also be noted that during the whole period of braking on reverse running, the jaw 62 does not leave the fixed support 75, which provides smooth and silent operation.

At the beginning of a braking action on reverse running, the secondary chambers 51 and 51' of the wheel cylinders 64 and 64' of the front brakes increase in volume by the quantity which corresponds to the approach of the jaw 62 towards the drum, which tends to put these chambers 51 and 51' momentarily under depression.

According to the invention, the spring 52 is chosen sufficiently strong to retard the moment at which the plunger 33 causes the closure of the valve 49, so that the secondary chambers 51 and 51' first receive the oil which they need from the tank 25. This oil drawn in at 51 and 51', passes directly from the tank 25 through the valve 28 into the chamber 24, then through the passage 46 into the chamber 41 and through the valve 49, which is still open, into the conduit 50 from which it passes to 51 and 51'. It is from this moment that, due to the action of the primary pressures at 37 and 38 and against the action of the spring 52, the plunger 33 is displaced towards the left of FIG. 9, causing the closure of the valve 49.

It will be observed that the calibration of the spring 52 may be fixed at a high value without disturbing the front-rear distribution, by virtue of the high locking pressure of the front brakes.

During a braking action on reverse running, the order of coming into action is therefore successively: outward movement of the primary pistons 68 and 68', outward movement of the secondary pistons 69 and 69', volumetric compensation by the valve 28, and displacement of the plunger 33 with closure of the valve 49.

If, during the course of braking on forward running, the secondary circuit 50 broke, the assembly of the jaws 61, 62 would rotate in the direction of the arrow F until the jaw 61 came into application against the fixed support 75. The jaw 61 acts under compression due to the effect of the primary pressure at 44, applied over the section of the bore 65. The jaw 62 acts under tension due to the effect of the primary pressure at 44 applied over the section of the bore 67. The braking power is somewhat greater than on reverse running in normal service, but is lower than the normal power on forward running, which is quite suitable for automobile applications in general.

In the event of a break in the primary circuit 43 or 43', everything takes place normally in the front brake which is not affected by this fracture, and in the other front brake, the secondary pressure acts on the jaw 62 which works in tension, while the jaw 61 no longer comes into contact. The power is about 70 to 75% of that of the non-defective side.

It can thus be seen that the installation according to the invention offers excellent safety in the event of a break in any one of the three circuits.

Reference will now be made to FIGS. 10 to 15, in which the arrangement is similar to that which has just been described with reference to FIGS. 1 to 9, but in which the construction of the front brakes is modified.

In FIG. 10, there are again seen at 61 the primary jaw, at 62 the secondary jaw, and at 75 the fixed support, against which the secondary jaw 62 is normally applied, while the primary jaw 61 is spaced apart therefrom by the clearance 76. In this case however, the jaws 61 and 62 are coupled to each other by an articulation pivot 150. The fixed support 75 is rigidly fixed to a fixed end-plate 151 and to a pair of supporting members 152 and 153. The members 152 and 153 are provided with a hole 170 (see FIG. 11) so as to permit the free passage of the pivot 150.

A small plate 154 known as the centering plate is pivotally mounted on the pivot 150. This plate comprises an elongated slot 155 mounted with play around the fixed support 75. The plate 154 is acted upon by a spring 156 hooked on the jaw 62 in abutment against a finger 157 rigidly fixed to the jaw 62. An abutment face 158 is provided on the jaw 62, the said jaw 62 coming into co-operation with the fixed support 75 through the agency of the abutment face 158, during braking on reverse running. The face 158 would come into application against the support 75 in case of braking on forward running, if the braking circuit acting directly on the jaw 61 became broken. An abutment face 159 is provided on the jaw 61, through which abutment face the said jaw 61 comes into co-operation with the fixed support 75 during braking on forward running, and in the event of a fracture of the braking circuit acting directly on the jaw 62.

A restoring spring similar to the spring 78 of FIG. 2, acts on the jaws 61 and 62 in the position of rest.

When at rest, the various constituent parts of the brake are in the positions shown in FIG. 10. It will be noted that in this position, the clearance between the centering plate 154 and the fixed support 75 is distributed on each side of this latter, the jaws 61 and 62 being floating.

During braking on forward running with the wheels turning in the direction of the arrow F, the drum 63 displaces the jaws in the direction indicated by this arrow. The centering plate 154 comes into abutment against the fixed support 75 at 160, and then leaves the finger 157 while carrying out a movement of rotation about the common pivot 150. This displacement of the jaws 61 and 62 brings the latter into abutment against the oil in the chamber 51 of the wheel cylinder (see FIG. 2).

The arrangement of FIGS. 10 to 15 has the following advantages: at rest, the jaws 61 and 62 are floating and take-up their most adequate position without any stress. In addition, the return of the primary jaw 61 to the position of rest by the spring 156 and through the intermediary of the plate 154 is effected by forces the direction of which does not involve any parasitic components which can act on the secondary jaw 62 and which may interfere with its return by rubbing against the drum 63.

The spring 156 being coupled to the centering plate 154 and to the jaw 62 which are not co-planar, this spring 156 acts through the intermediary of the common pivot 150 to urge the jaws 61 and 62 to be inclined one with respect to the other with a V-shape, the point of which is directed towards the end-plate 151. The contact of the centering plate 154 with the finger 157 is advantageously effected over a zone 161 such that the perpendicular 162 at this zone meets the line of action 163 of the spring 156 at a point 164 belonging to the horizontal straight line 165 passing through the centre 166 of the common pivot 150.

This arrangement makes it possible for the plane of symmetry of the V to be made vertical and perpendicular to the plane of the end-plate 151, and to take advantage of this force in order to maintain the jaws 61 and 62 in the position of rest. A lining 167 is provided for that purpose between the end-plate 151 and the common pivot 150. As soon as the jaws 61 and 62 are subjected to a braking action on forward running, this force due to the spring 156 disappears, since the centering plate 154 has come into contact with the fixed support 75 while leaving the finger 157, and is replaced by a force acting upwards on the extremity of the pivot 150 furthest from the end-plate 151, which moves the pivot 150 away from the end-plate 151.

It will be noted that the articulation at 150 of the two jaws 61 and 62 on each other has the effect of making uniform the wear of the linings carried by these two jaws 61 and 62, since it prevents any relative movement downwards or upwards of the two jaws 61 and 62.

In the alternative form shown in FIG. 16, the arrangement is similar to that which has been described above with reference to FIGS. 10 to 16, but a spring 168 is provided in addition so as to give the jaws 61 and 62 a position in the condition of rest such that the jaw 62 is in abutment by its face 158 against the fixed support 75. The spring 168 acts by torsion between the articulation pivot 150 and the fixed support 75.

In the arrangements shown in FIG. 10 and in FIG. 16, the fixed support 75 is arranged on the outer side of the articulation pivot 150. This relative position may, however, be modified as has been shown in FIG. 17, in which the fixed support, designated by 75a, is arranged on the inner side with respect to the articulation pivot, designated by 150a, of the jaws indicated by 61a and 62a. It will be observed that the three lines of action indicated by 162a, 163a and 165a are again concurrent at 164a.

In the alternative form shown in FIG. 18, the arrangement is similar to that shown in FIG. 17, but a spring 168a, similar to the spring 168 of FIG. 16, is provided in order to give the jaws, in the condition of rest, a position such that the jaw 62a is in abutment by its face 158a against the fixed support 75a.

What I claim is:

1. A double-circuit hydraulic brake comprising a fixed wheel cylinder receiving two opposite pistons cooperating respectively with two hydraulic chambers formed in said wheel cylinder, two jaws which are respectively coupled to said pistons and which are intended to come into frictional contact ith a rotating drum, coupling means for connecting together said jaws in a zone diametrically opposite to said wheel cylinder, and a fixed support interposed in said zone between said jaws, both of said jaws being spaced from said fixed support upon braking during forward running, one of said jaws being applied against said fixed support while the other jaw is spaced apart therefrom by a predetermined clearance upon braking during reverse running, so that upon braking during forward running both of said jaws are compressed, while upon braking during reverse running one of said jaws is compressed and the other of said jaws is tensioned.

2. A brake as claimed in claim 1, in which said coupling means comprise a spacing rod by which the two jaws co-operate in reciprocal abutment and on which said jaws are elastically held.

3. A brake as claimed in claim 1, in which said fixed support comprises means for laterally positioning said jaws.

4. A brake as claimed in claim 3, in which said positioning means comprise two cheeks.

5. A brake as claimed in claim 1, in which a centering spring acts between one of said jaws and said fixed support, whereby in the position of rest, it is this jaw which is applied against said support.

6. A brake as claimed in claim 1, in which a restoring spring acts between said jaws in such manner as to bring them closer together while moving them away from said drum towards a position of rest defined by a condition of minimum distance, said spring being arranged in the vicinity of said wheel-cylinder.

7. A brake as claimed in claim 1, one of said chambers being an actuating chamber while the other said chamber acts as an oil cushion abutment in forward drive, said predetermined clearance being greater than the circumferential movement of said jaws upon braking during forward running.

8. A brake as claimed in claim 2, said spacing rod and said fixed support being spaced from each other radially of the axis of rotation of said drum.

9. A brake as claimed in claim 1, in which a rod is engaged with a definite play in a hole of one of said jaws, and is engaged with a unidirectional wedging action in a hole of a member in the form of a square, pivotally mounted on the other said jaw, a spring being coupled between said square member and said first jaw, whereby the withdrawal of the jaws with respect to said drum is maintained constant and defined by said play, irrespective of the state of wear of said jaws.

10. A brake as claimed in claim 9, in which said spring forms a restoring spring to bring said jaws closer together while moving them away from the drum, towards a position of rest defined by a condition of minimum distance.

11. A double-circuit hydraulic brake comprising a fixed wheel cylinder receiving two opposite pistons co-operating respectively with two hydraulic chambers formed in said wheel cylinder, two jaws which are respectively coupled to said pistons and which are intended to come into frictional contact with a rotating drum, coupling means for connecting together said jaws in a zone diametrically opposite to said wheel cylinder, and a fixed support interposed in said zone between said jaws, either of said jaws being adapted to be applied against said fixed support while the other jaw is spaced apart therefrom by a predetermined clearance, said two pistons being respectively engaged in two coaxial bores separated by an intermediate bore which is also coaxial, one of the pistons having a smaller diameter than the other piston while the intermediate bore has a still smaller diameter than said one piston and receives a tail of said other piston, the two pistons being capable of passing freely out of their respective bores and being separated by a weak spring which tends to move them apart.

12. A brake as claimed in claim 11, in which the tail of said secondary piston slidably receives a ring urged by a spring against an abutment fixed to said tail, while a keeper-ring is engaged with hard friction in the secondary bore and is engaged with a small play in a groove formed in said ring.

13. A double-circuit hydraulic brake comprising a fixed wheel cylinder receiving two opposite pistons co-operating respectively with two hydraulic chambers formed in said wheel cylinder, two jaws which are respectively coupled to said pistons and which are intended to come into frictional contact with a rotating drum, floating coupling means connecting together said jaws for pivotal movement relative to each other about a common axis that passes through both said jaws in a zone diametrically opposite to said wheel cylinder, and a fixed support interposed in said zone between said jaws, either of said jaws being adapted to be applied against said fixed support while the other jaw is spaced apart therefrom by a predetermined clearance.

14. A brake as claimed in claim 13, in which a centering plate co-operating with said fixed support is pivotally mounted on the articulation pivot of the two jaws.

15. A brake as claimed in claim 14, in which said centering plate is coupled by a spring to one of said jaws and is returned by said spring in abutment application of one face of said plate against a finger fixed to said jaw.

16. A brake as claimed in claim 15, in which the line of action of said spring, a straight line passing through said fixed support and perpendicular to the plane of symmetry of the brake, and a straight line perpendicular to the abutment face of said plate against said finger, are concurrent.

17. A brake as claimed in claim 14, in which a spring acts between said fixed support and said articulation pivot so as to bring one of the jaws in abutment against the fixed support to the position of rest.

18. A brake as claimed in claim 14, in which said fixed support is arranged on the outer side with respect to said articulation pivot.

19. A brake as claimed in claim 14, in which said fixed support is arranged on the inner side with respect to said articulation pivot.

References Cited
UNITED STATES PATENTS

| | | |
|---|---|---|
| 2,291,662 | 8/1942 | Thibeault. |
| 2,484,410 | 10/1949 | Janes. |
| 2,957,551 | 10/1960 | Nahodil. |
| 3,305,051 | 2/1967 | Maurice. |
| 3,349,875 | 10/1967 | Stelzer. |

DUANE A. REGER, Primary Examiner

U.S. Cl. X.R.

188—79, 152